(12) United States Patent
Wenzel (10) Patent No.: US 8,385,372 B2
(45) Date of Patent: Feb. 26, 2013

(54) TIME-BASED MAINTENANCE VIA A PACKET-ORIENTED DIGITAL INTERFACE IN RADIO-FREQUENCY TRANSMITTING AND RECEIVING ASSEMBLIES

(75) Inventor: Dietmar Wenzel, Munich (DE)

(73) Assignee: Intel Mobile Communications GmbH, Neubiberg (DE)

( * ) Notice: Subject to any disclaimer, the term of this patent is extended or adjusted under 35 U.S.C. 154(b) by 448 days.

(21) Appl. No.: 12/691,039

(22) Filed: Jan. 21, 2010

(65) Prior Publication Data
US 2011/0176561 A1 Jul. 21, 2011

(51) Int. Cl.
*H04W 56/00* (2009.01)

(52) U.S. Cl. .................. 370/503; 370/514
(58) Field of Classification Search .......... 370/503, 370/509, 514
See application file for complete search history.

(56) References Cited

U.S. PATENT DOCUMENTS

| | | | |
|---|---|---|---|
| 2009/0022177 A1* | 1/2009 | Schuster et al. | 370/468 |
| 2009/0180462 A1* | 7/2009 | Duerdodt et al. | 370/347 |
| 2010/0074311 A1* | 3/2010 | Kopmeiners | 375/220 |

* cited by examiner

*Primary Examiner* — Melvin Marcelo
(74) *Attorney, Agent, or Firm* — SpryIP, LLC (57) ABSTRACT

Disclosed herein are techniques, systems, and methods relating maintaining a time base between receiving and transmitting assemblies during interruption of data streams communicated therebetween.

24 Claims, 7 Drawing Sheets

TIME-BASED MAINTENANCE VIA A PACKET-ORIENTED DIGITAL INTERFACE IN RADIO-FREQUENCY TRANSMITTING AND RECEIVING ASSEMBLIES

BACKGROUND

In modern mobile communication systems different mobile radio standards like Universal Mobile Telecommunications System (UMTS), Wideband Code Division Multiple Access (WCDMA), Global System for Mobile communication (GSM), and enhanced data rates for GSM evolution (EDGE) are used. Thereby the GSM standard is often referenced as second generation standard (2G), EDGE is referenced as a standard of generation 2.5 (2.5G) and UMTS is referenced as a third generation standard (3G).

Respective radio frequency (RF) signals are received and processed in a radio frequency unit which may be used for down converting the radio frequency signals to base band (BB) signals. Such radio frequency units are in many cases implemented in an integrated circuit. The data received by the radio frequency unit from an antenna are converted to digital signals which are transmitted to a base band unit for further processing. A function of the radio frequency unit can be controlled by the base band unit. It is furthermore possible that an interface between the radio frequency unit and the base band unit is realized as a interface. Such an interface is not restricted to transmit received (RX) data from a radio frequency unit to a base band unit but also to transmit data to be transmitted (TX) via a radio frequency unit between the base band unit and the radio frequency unit.

Respective base band units and radio frequency units can be able to operate within the GSM/EDGE standard or the UMTS standard or both the GSM/EDGE and the UMTS standard. In other words, various combinations of 2.5G mobile radio standards and 3G mobile communication standards are possible. A GSM/EDGE standard is also referenced as an enhanced general packet radio service (EGPRS).

When transmitting data over the interface between the radio frequency unit and the base band unit, it is possible that a time base for the transmitted data is defined and adhered to.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

The present application describes maintaining a time base between receiving and transmitting assemblies during interruption of data streams communicated therebetween. Many specific details are set forth in the following description and in FIGS. 1-10 to provide a thorough understanding of various implementations. One skilled in the art will understand, however, that the subject matter described herein may have additional implementations, or that the concepts set forth may be practiced without several of the details described in the following description.

Overview of System 100

Figure 1:
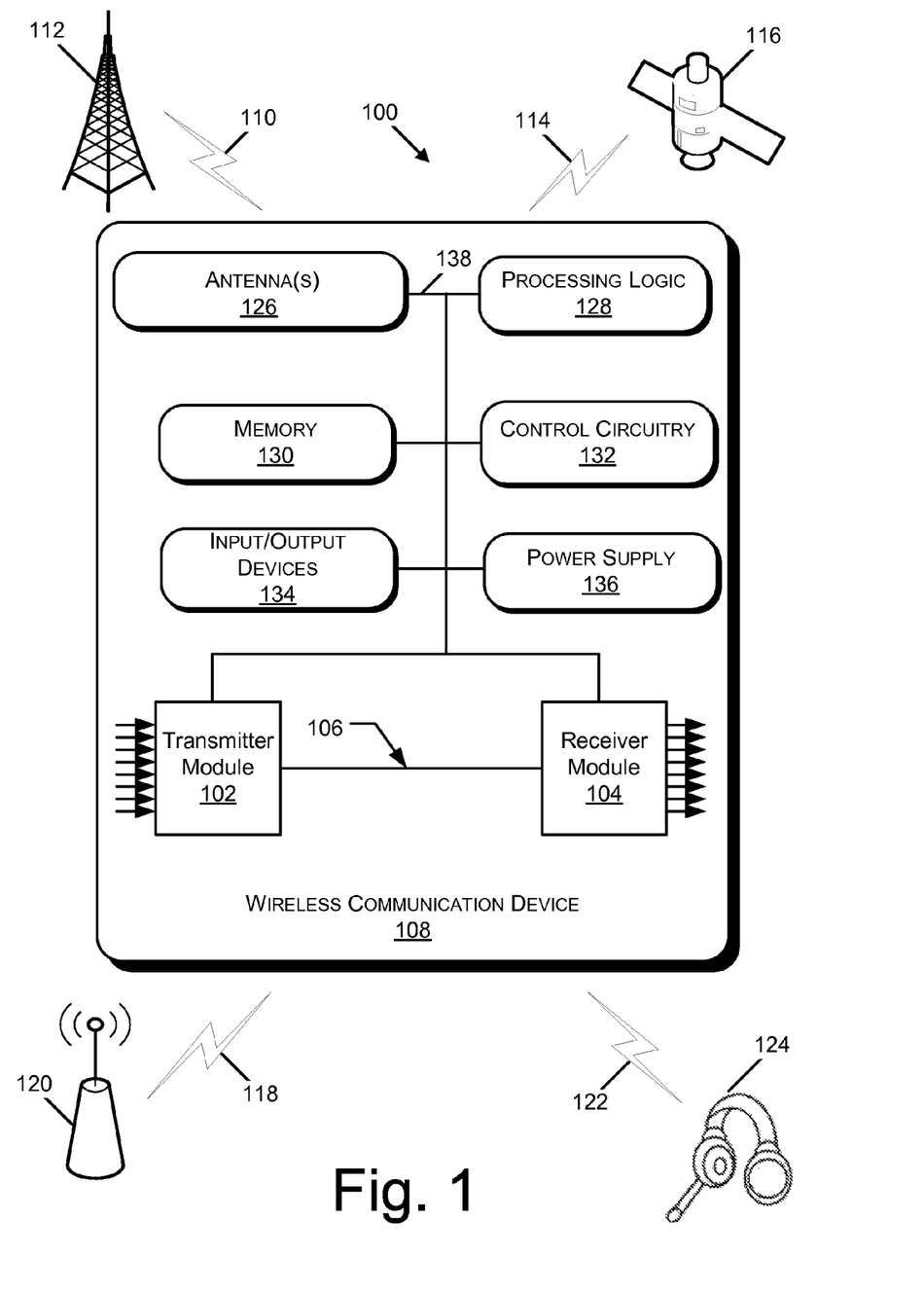
FIG. 1 is a block diagram of a system comprising a transmitting module and a receiving module coupled together via a serial interface.

FIG. 1 shows an overview of a system 100 including a wireless communication device 108. The wireless communication device 108 is configured to transmit wireless signals to, and receive wireless signals from, one or more external devices. The wireless signals may include voice traffic, data, control information, or any combination thereof. The wireless communication device 108 may be implemented in any number of ways, including as a smart phone, a hand-held computing device (e.g., a personal digital assistant (PDA)), a mobile telephone, a media playing device, a portable gaming device, a personal computer, a laptop computer, another suitable wireless communication device, or any combination thereof.

In one implementation, the wireless communication device 108 may transmit and/or receive wireless signals 110 via a base station 112. The base station 112 may be included in a wide area wireless communication network, such as a global system for mobile communications (GSM) network, a UMTS network, a CDMA network, a high speed packet access (HSPA) network, a general packet radio service (GPRS) network, an enhanced data rates for GSM evolution (EDGE) network, a worldwide interoperability for microwave access (WiMAX) network, a time division multiple access (TDMA) network, a frequency division multiple access (FDMA) network, a long term evolution (LTE) network, a WiMedia ultra wideband (UWB) network, or any combination thereof.

In another implementation, the wireless communication device 108 may transmit and/or receive wireless signals 114 via a communication satellite 116. Further, the wireless communication device 108 may transmit and/or receive wireless signals 118 via a wireless access point 120. The wireless access point 120 may be included in a wide area wireless network or a wireless local area network, such as a Bluetooth network or an Institute of Electrical and Electronics Engineers (IEEE) 802.11 protocol network. Additionally, the wireless communication device 108 may transmit and/or receive wireless signals 122 via a headset 124, such as a Bluetooth headset.

In a particular implementation, the wireless communication device 108 includes a transmitter module 102 and a receiver module 104. Transmitter module 102 and receiver module 104 may at least transmit and receive signals via one or more antennas 126. In particular, the wireless communications device 108 is configured to process signals to be transmitted and to process signals received via one or more wireless communication technologies. The one or more antennas 126 may be placed in various locations of the wireless communication device 108, such as a bottom portion or a top portion of the wireless communication device 108.

The wireless communication device 108 also includes additional components, such as processing logic 128 and memory 130. The processing logic 128 may include one or more processors and the memory 130 is accessible to the processing logic 128. The memory 130 may include read-only memory (ROM), random access memory (RAM), flash memory, a hard disk, or any combination thereof. Additionally, the memory 130 may store one or more applications configured to transmit and/or receive wireless signals. For example, the memory 130 may store an application configured to send and receive wireless signals related to telephone calls, such as voice traffic or control information. In another example, the memory 130 may store an application configured to request and receive website data, an application configured to transmit and receive text messages, an application configured to transmit and receive picture messages, an application configured to transmit and receive video messages, or any combination thereof. The applications stored in the memory 130 may include software instructions, hardware, or any combination thereof. Additionally, the wireless communication device 108 includes control circuitry 132. The control circuitry 132 provides control signals to the components of the wireless communication device 108.

Further, the wireless communication device 108 includes one or more input/output devices 134. In an illustrative embodiment, the input/output devices 134 may include a microphone, a speaker, a touchpad display, a cursor control device, such as a mouse, a keypad, or any combination thereof. Additionally, the wireless communication device 108 includes a power supply 136, such as a battery, and a bus 138 to facilitate the communication of signals between components of the wireless communication device 108.

Transmitter Module 102

Figure 2:
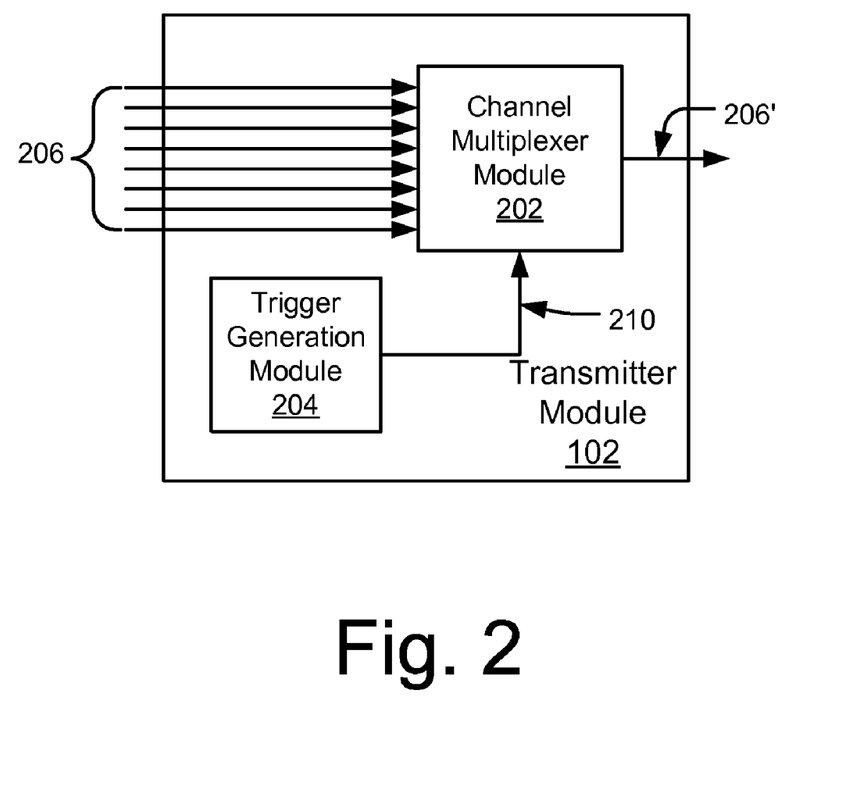
FIG. 2 is a block diagram of the transmitting module of FIG. 1

FIG. 2 shows transmitter module 102 in further detail. Transmitter module 102 comprises a channel multiplexer module 202 and a trigger generation module 204. In an embodiment, transmitter module 102 is a baseband module employed in a mobile communications device. Transmitter module 102, and further channel multiplexer module 202, is configured to receive a plurality of data streams $S_1$-$S_8$ via channels 206a-h. Channels 206, and thus data streams $S_1$-$S_8$, may comprise any combination of data channels/streams, control channels/streams, and synchronization channels/streams; however the total number of channels 206 and the number of data, control, and synchronization channels/streams may vary depending upon the application desired and/or the Mobile Industry Processor Interface (MIPI) standard interface.

Control channels/streams are employed for communicating configuration/control information and real-time information between transmitter module 102 and receiver module 104. In an implementation, control channels are control logical channels (CLC). Data channels/streams are employed for communicating data and sampled values between transmitter module 102 and receiver module 104. In an implementation, data channels are data logical channels (DLC).

Figure 3:
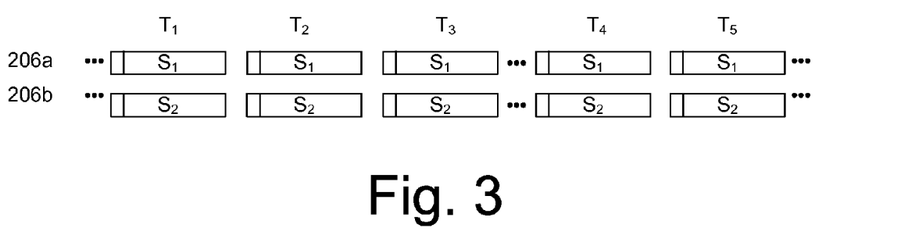
FIG. 3 is a timing diagram of data streams communicated between the transmitting and receiving modules of FIG. 1.

FIG. 3 shows data streams $S_1$ and $S_2$ of data streams $S_1$-$S_8$ being transmitted employing channels 206a and 206b, respectively, during time periods $T_1$-$T_5$. In an embodiment, data streams $S_1$ and $S_2$ (and also data streams $S_3$-$S_8$) may be radio signals received via a mobile communications network. In a further embodiment, only a subset of data streams $S_1$-$S_8$ and channels 206 may be employed by system 100, i.e. only data streams $S_1$ and $S_2$ and only 2 channels 206 (206a and 206b) may be employed. Thus, there are remaining unused channels 206. However, any combination of data streams $S_1$-$S_8$ may be employed by system 100. Transmission of data streams $S_1$ and $S_2$ via channels 206a and 206b, respectively, are effected in a packet-orientated manner. In the present example, for ease of example and illustration, only 2 data streams ($S_1$ and $S_2$) will be described for transmission between transmitter module 102 and receiver module 104. However, any combination and number of data streams may be employed by system 100.

Figure 4:
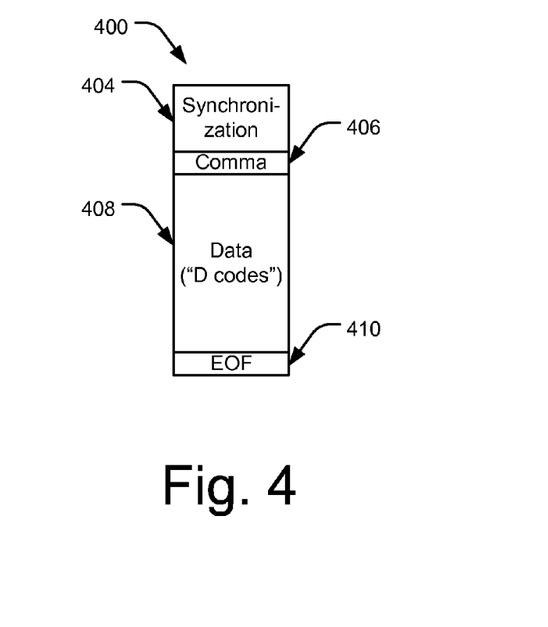
FIG. 4 is a block diagram of a data packet of the data streams of FIG. 3.

FIG. 4 shows a data packet 400 that may be part of any of data streams $S_1$ and $S_2$. Data packet 400 comprises a synchronization portion 404, a comma (K code) portion 406, a data (D code) portion 408, and an end portion (EOF) portion 410. Synchronization portion 404, comma portion 406, and end portion 410 are identical in each data packet 400.

Each channel 206 may transmit only one type of data packet 400. More specifically, each channel 206 may only transmit a data stream $S_1$-$S_8$ that comprises data packets 400 having substantially the same packet format, i.e. substantially the same size of data portion 408. Thus, data packets 400 of data streams $S_1$-$S_8$ having differing packet format sizes are transmitted down differing channels 206, i.e. data stream $S_1$ is transmitted employing channel 206a, data stream $S_2$ is transmitted employing channel 206b, etc. Further, the size of data portion 408 may be adjustable such that data packets 400 may be transmitted along one of channels 206.

As mentioned above, channel multiplexer module 202 is configured to receive the plurality of data streams $S_1$-$S_8$ via channels 206. Further, channel multiplexer module 202 is configured to receive a trigger signal $T_R$ from trigger generation module 204 via a channel 210. Trigger signal $T_R$ comprises a trigger message packet that may be inserted within data streams $S_1$-$S_8$, described further below.

In an embodiment, channel 206' is a serial transmission path. As such, channel 206' may comprises only one channel 206 at a time and further only one of data streams $S_1$-$S_8$ may be transmitted along channel 206' at a time. Channel multiplexer module 202 is configured to selectively output a signal $S_{output}$ that comprises one of data streams $S_1$-$S_8$. More specifically, channel multiplexer module 202 selects one of data streams $S_1$-$S_8$ to place into packet format for transmission along channel 206' and outputs this as a signal $S_{output}$ via channel 206'. Receiver module 104 is configured to receive signal $S_{output}$, described further below.

In a further embodiment, transmitter module 102 may perform various other functions on data streams $S_1$-$S_8$ dependent upon the application desired.

Synchronization Between Transmitter Module 102 and Receiver Module 104

As mentioned above, data streams $S_1$ and $S_2$ may be radio signals received via a mobile communications network. Therefore, it may be desired to enable synchronization between transmitter module 102 and receiver module 104 such that data streams $S_1$ and $S_2$ are correctly demodulated. To demodulate data streams $S_1$ and $S_2$, the transmission time of signal $S_{output}$ by transmitter module 102 and the reception time of signal $S_{output}$ by receiver module 104 are compiled very precisely, i.e. a time base is established. To establish the time base between transmitter module 102 and receiver module 104, time accurate strobe (TAS) message packets are communicated between transmitter module 102 to receiver module 104. The TAS message packets define a temporal reference point for the sampling pattern of data streams $S_1$ and $S_2$.

However, transmission of data streams $S_1$ and $S_2$ via signal $S_{output}$ from transmitter module 102 to receiver module 104 may be interrupted for monitoring purposes for other frequencies or other radio standards. This occurs during compressed mode (CM) or similarly continuous packet connectivity (CPC) mode. Upon completion of the interruption of data streams $S_1$ and $S_2$, it may be desired to maintain the time base between transmitter module 102 and receiver module 104 to facilitate future demodulation of data streams $S_1$ and $S_2$ as opposed to established a new time base. Maintaining the time base during the interruption period may be referred to as Continuous Time Base Mode (CTBM).

Maintaining the Time Base

To maintain the time base during the interruption period of data streams $S_1$ and $S_2$, data streams $S_1$ and $S_2$ comprise a trigger message packet. More specifically, during the interruption of data streams $S_1$ and $S_2$, channel multiplexer module 202 inserts a trigger message packet from trigger signal $T_R$ into data streams $S_1$ and $S_2$ such that data streams $S_1$ and $S_2$ comprises the trigger message packet of the trigger signal $T_R$.

Trigger signal $T_R$ comprises a trigger message packet that represents a volume of data representative of a data packet 400, i.e. a volume of data that represents the same number of regular sampled values that would be transmitted if the interruption of data streams $S_1$ and $S_2$ did not occur. As a result, the time base between transmitter module 102 and receiver module 104 is maintained, as desired without increasing the bit rate during transmission of trigger signal $T_R$. Rather, the bandwidth during transmission of trigger signal $T_R$ may be reduced as a short trigger message packet 500 is sent rather than a series of placeholders, such as a series of zeroes or other data, that have the same packet size as the data packet 400. This may additionally advantageously result in a lower power consumption of system 100.

Figure 5:
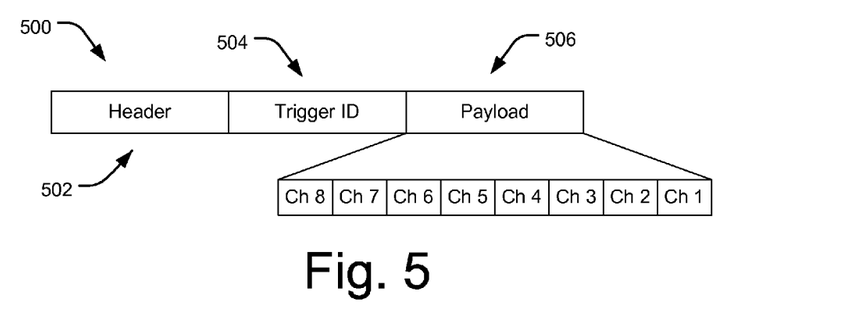
FIG. 5 is a block diagram of a trigger message packet of the data streams of FIG. 3

Trigger signal $T_R$ may have a 1 bit value (or any bit value) and represent a defined number of zero values, one values, random values, or any type of data/freely selectable data sequences that will maintain the time base between transmitter module 102 and receiver module 104. FIG. 5 shows a trigger message packet 500 that comprises trigger signal $T_R$. Trigger message packet 500 comprises a header portion 502, a trigger identification portion 504, and a payload portion 506. Payload portion 506 comprises information regarding which stream $S_1$-$S_8$, and thus which channel 206, trigger message packet 500 is representative of. To that end, trigger message packet 500 may be representative of one signal stream $S_1$-$S_8$ and, correspondingly, a single or multiple channels 206 carrying that signal stream or, message packet 500 may be representative of a plurality of signal streams $S_1$-$S_8$, and thus a plurality of channels 206. The payload portion 506 may be utilized to contain trigger information regarding one or more channels and or one more signal streams. The trigger message packet 500 may contain a representation of single bits or a single data packet 400 for use in maintaining the time base; however, in a further embodiment, trigger message packet 500 may be representative of a plurality of data packets 400. Accordingly, the trigger message 500 may indicate that single or multiple bits, or single or multiple packets, should be represented as zero values, one values, random values, or any type of data/freely selectable data sequences that will maintain the time base between transmitter module 102 and receiver module 104 with regard to the channel 206 to which the trigger message packet 500 corresponds.

As mentioned above, upon interruption of data streams $S_1$ and $S_2$, data streams $S_1$ and $S_2$ comprise trigger message packet 500. However, trigger message packet 500 is of a different packet format and/or size than that of data packet 400, and thus, data streams $S_1$ and $S_2$ comprising trigger message packet 500 cannot be transmitted employing the same channel 206 as previously employed to transmit data streams $S_1$ and $S_2$ comprising data packet 400. To that end, the data streams $S_1$ and $S_2$ comprising trigger message packet 500 are transmitted employing a differing channel 206, with the differing channel 206 being previously unused by system 100, i.e. a channel 206 that is not employed to transmit a data stream $S_1$-$S_8$ and is further able to transmit the packet format size of the trigger signal $S_9$. To transmit data streams $S_1$ and $S_2$ comprising trigger message packet 500, one of channels 206 is established to accept the packet size of that of trigger message packet 500. The channel 206 that is to transmit data streams $S_1$ and $S_2$ comprising trigger message packet 500 is defined within header portion 502 of trigger message packet 500. As mentioned above, the payload portion 506 may define which channels 206 will have single or multiple bits, or single or multiple packets, represented as zero values, one values, random values, or any type of data/freely selectable data sequences that will maintain the time base between transmitter module 102 and receiver module 104.

Interruption of Data Streams $S_1$ and $S_2$

Figure 6:
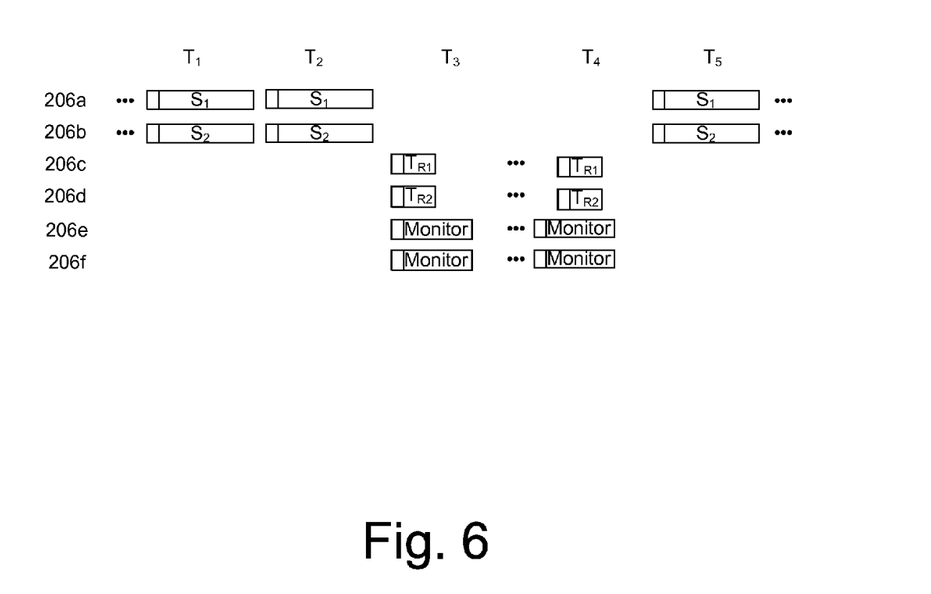
FIG. 6 is a timing diagram of data streams communicated between the transmitting and receiving modules of FIG. 1.

FIG. 6 shows data streams $S_1$ and $S_2$ being interrupted by system 100. More specifically, during time periods $T_1$ and $T_2$, data streams $S_1$ and $S_2$ comprise data packets 400 and are transmitted employing channels 206a and 206b, respectively. During time periods $T_3$ and $T_4$, data streams $S_1$ and $S_2$ comprise trigger message packets 400 (shown as $T_{R1}$ and $T_{R2}$ in the figures), and thus are transmitted employing channels differing from channels 206a and 206b, i.e. transmitted employing channels 206c and 206d, respectively. Channels 206c and 206d are established to accept the packet size (and format) of trigger message packet 500. During time period $T_5$, data streams $S_1$ and $S_2$ comprise data packets 400 and are again transmitted employing channels 206a and 206b, respectively.

Further, the monitor data that may be obtained during the interruption of data streams $S_1$ and $S_2$ is communicated employing further differing channels, i.e. channels 206e and 206f. Thus, during time periods $T_3$ and $T_4$, only the monitor data and short trigger message packets 500 are transmitted, instead of zero filled (or other data sequences that will maintain the time base) data packets, which would be much longer than the trigger message packets 500. This sending of the shorter trigger message packets 500 (instead of the longer data packets) advantageously reduces the bit rate during time periods $T_3$ and $T_4$.

Receiver Module 104

Figure 7:
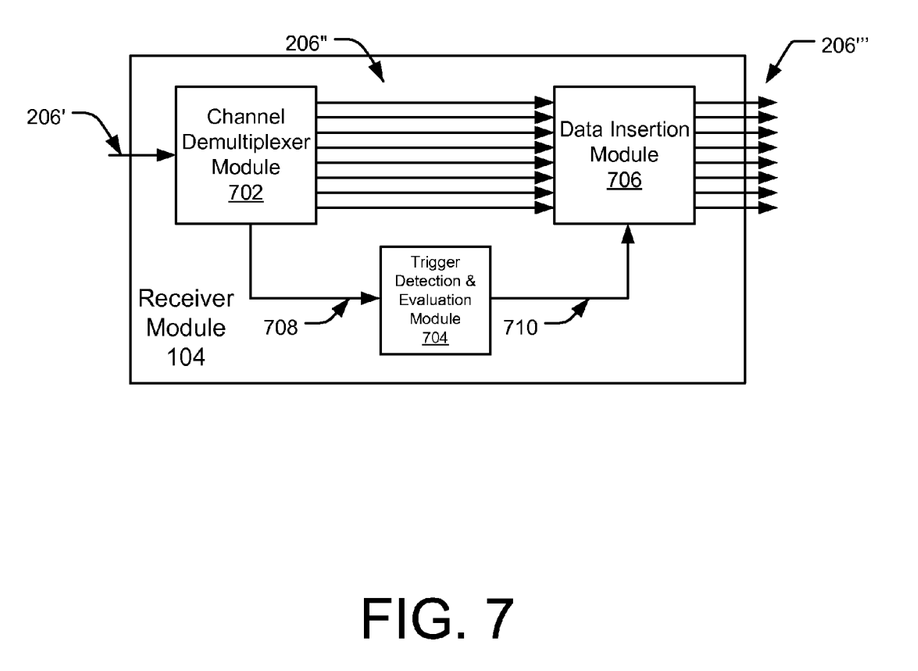
FIG. 7 is a block diagram of the receiving module of FIG. 1.

FIG. 7 shows receiver module 104 in further detail. Receiver module 104 comprises a channel demultiplexer module 702, a trigger detection and evaluation module 704, and a data insertion module 706. In an embodiment, receiver module 104 is a radio frequency (RF) transceiver.

Receiver module 104, and further channel demultiplexer module 702, is configured to receive signal $S_{output}$ from transmitter module 102 via transmission path 106. Channel demultiplexer 702 determines the contents of signal $S_{output}$, i.e. which data stream $S_1$-$S_8$ that signal $S_{output}$ comprises. Were signal $S_{output}$ to comprise one of data streams $S_1$-$S_8$ comprising data packets 400, channel demultiplexer 112 outputs the data stream $S_1$-$S_8$ along channels 206". However, were signal $S_{output}$ to comprise one of data streams $S_1$-$S_8$ comprising trigger message packet 500 (indicated based upon trigger identification portion 504 of trigger message packet 500), channel demultiplexer module 702 outputs the data stream $S_1$-$S_8$ as signal $S_{output'}$ via a control line 708. Trigger detection and evaluation module 704 is configured to receive signal $S_{output'}$ from channel demultiplexer 702. Trigger detection and evaluation module 704 detects and evaluates the trigger message packet 500 within data stream $S_1$-$S_8$ and outputs this signal as $S_{output'''}$ via a control line 710.

Data insertion module 706 is configured to receive data streams $S_1$-$S_8$ from channel demultiplexer 702 via channels 206'' and further configured to receive signal $S_{output''}$ from trigger detection and evaluation module 704. Were data insertion module 706 to receive data streams $S_1$-$S_8$ comprising data packets 400, data insertion module 706 outputs the data streams $S_1$-$S_8$ as they were received and outputs this along channels 206'''. Were data insertion module 706 to receive signal $S_{output''}$ indicative of one of data streams $S_1$-$S_8$ comprising trigger message packet 500, data insertion module 706 accordingly inserts the correct number of data values used to maintain the time base between transmitter module 102 and receiver module 104 in the respective data stream $S_1$-$S_8$ and outputs this along channels 206'''. The correct number of data values to be inserted in the respective data stream $S_1$-$S_8$ is a function of the particular data stream $S_1$-$S_8$, i.e. each channel 206 has a packet size associated therewith, and thus, a certain number of data values associated with the packet size. Further, the data values to be inserted may be substantially the same size as data packets 400.

In a further embodiment, were data insertion module 706 to receive signal $S_{output''}$ indicative of a plurality of data streams $S_1$-$S_8$ comprising trigger message packets 500, data insertion module 706 accordingly inserts the correct number of data values in the respective plurality of data stream $S_1$-$S_8$ and outputs this along channels 206'''.

As a result, the time base between transmitter module 102 and receiver module 104 is maintained, as desired, without further synchronization therebetween.

Further Implementation of Transmitting Data Streams $S_1$ and $S_2$

Figure 8:
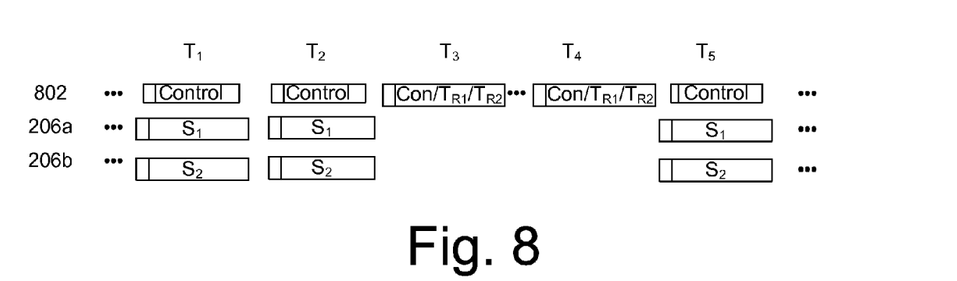
FIG. 8 is a timing diagram of data streams communicated between the transmitting and receiving modules of FIG. 1, in a further implementation.

FIG. 8 shows a further implementation of data streams $S_1$ and $S_2$ in which data streams $S_1$ and $S_2$ comprising trigger message packets 500 are transmitted via a high level control logical channel (HLCLC) 802. HLCLC 802 is a channel wherein packets of differing formats and/or length may be transmitted. Further, HLCLC 802 may further be employed to transmit other control information between transmitter module 102 and receiver module 104.

Specifically, FIG. 8 shows data streams $S_1$ and $S_2$ during time periods $T_1$ and $T_2$, data streams $S_1$ and $S_2$ comprise data packets 500 and are transmitted employing channels 206a and 206b, respectively. Further, during time periods $T_1$ and $T_2$, HLCLC 802 comprises control information. However, during time periods $T_3$ and $T_4$, data streams $S_1$ and $S_2$ comprise trigger message packets 500 and are transmitted employing HLCLC 802. HLCLC 802 also comprises control information during time period $T_3$ and $T_4$. During time period $T_5$, data streams $S_1$ and $S_2$ comprise data packets 400 and are again transmitted employing channels 206a and 206b, respectively. Further, during time period $T_5$, HLCLC 802 may additionally comprise control information.

The frequency with which control information is transmitted employing HLCLC 802 may not be high and as a result, data streams $S_1$ and $S_2$ comprising trigger message packets 500 may be transmitted in addition to the previous information in HLCLC 802 without restrictions. Thus, no additional channel 206 is employed to transmit data streams $S_1$ and $S_2$ comprising trigger message packets 500.

Further Implementation of Transmitting Data Streams $S_1$ and $S_2$

Figure 9:
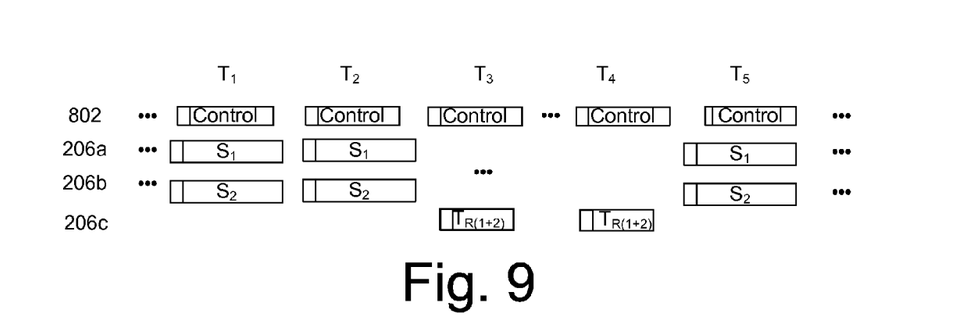
FIG. 9 is a timing diagram of data streams communicated between the transmitting and receiving modules of FIG. 1, in a further implementation.

FIG. 9 shows a further implementation of data streams $S_1$ and $S_2$ in which only one of data streams $S_1$ and $S_2$ comprises trigger message packets 500. Specifically, FIG. 9 shows data streams $S_1$ and $S_2$ during time periods $T_1$ and $T_2$, data streams $S_1$ and $S_2$ comprise data packets 400 and are transmitted employing channels 206a and 206b, respectively. However, during time periods $T_3$ and $T_4$, only one trigger message packet 500 (shown as $T_{R(1+2)}$ in the figures) is generated to refer to data streams $S_1$ and $S_2$. $T_{R(1+2)}$ is transmitted employing channel 206c, which may be established to accept the packet size (and formate) of trigger message packet 500. The trigger message packet 500 may be representative of a trigger message for both data streams $S_1$ and $S_2$.

To that end, data insertion module 706 accordingly inserts the correct number of data values in both respective data stream $S_1$ and $S_2$. Thus, only one trigger message packet 500 is transmitted, thus providing bit rate savings. During time period $T_5$, data streams $S_1$ and $S_2$ comprise data packets 400 and are again transmitted employing channels 206a and 206b, respectively. Of course, one will appreciate that the trigger message $T_{R(1+2)}$ may alternatively be transmitted employing HLCLC 802 as described with reference to FIG. 8.

Process Model 1000

Figure 10:
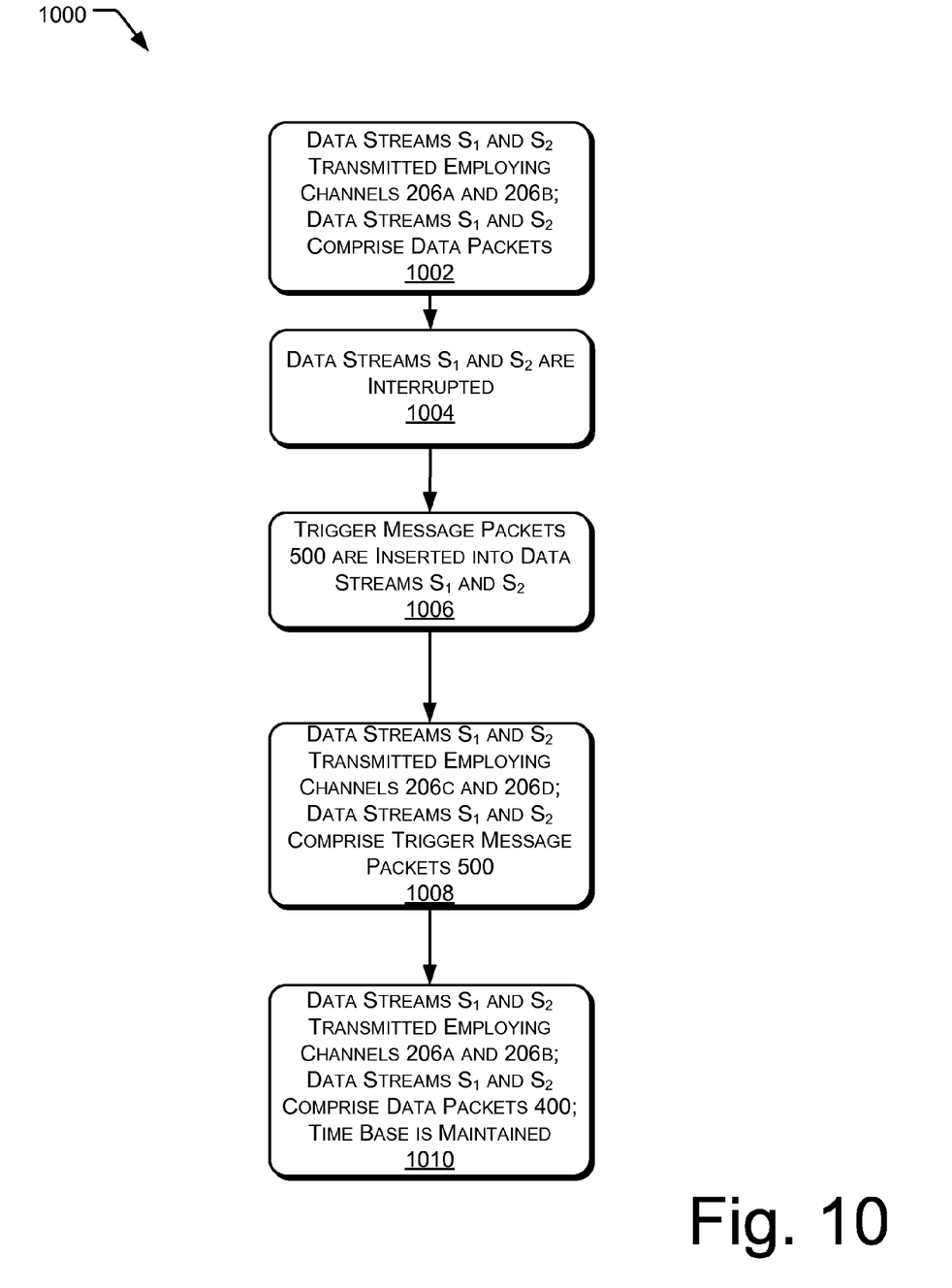
FIG. 10 is a flow chart of employing the system of FIG. 1.

FIG. 10 shows a method 1000 of employing system 100. The process 1000 is illustrated as a collection of referenced acts arranged in a logical flow graph, which represent a sequence that can be implemented in hardware, software, or a combination thereof. Specifics of exemplary methods are described below. However, the order in which the acts are described is not intended to be construed as a limitation, and any number of the described acts can be combined in other orders and/or in parallel to implement the process. Moreover, it should be understood that certain acts may be modified, and/or may be omitted entirely, depending on the circumstances.

At step 1002, data streams $S_1$ and $S_2$ are transmitted from transmitter module 102 to receiver module employing channels 206a and 206b, respectively. Data streams $S_1$ and $S_2$ comprise data packets 400.

At step 1004, data streams $S_1$ and $S_2$ are interrupted.

At step 1006, trigger message packets 500 are inserted into data streams $S_1$ and $S_2$ in place of data packets 400.

At step 1008, data streams $S_1$ and $S_2$ are transmitted from transmitter module 102 to receiver module employing channels 206c and 206d, respectively. Data streams $S_1$ and $S_2$ comprise trigger message packets 500. According to an alternative implementation, the trigger message packets 500 may alternatively be transmitted employing HLCLC 802.

At step 1010, data streams $S_1$ and $S_2$ are transmitted from transmitter module 102 to receiver module employing channels 206a and 206b, respectively while maintaining the time base between transmitter module 102 and the receiver module 104. Data streams $S_1$ and $S_2$ comprise data packets 400.

What is claimed is:

1. A system comprising:
a receiver module to receive at least one data stream; and
a transmitter module coupled to the receiver module via an interface, wherein during an uninterrupted time period, the transmitter module communicates the at least one data stream comprising data packets to the receiver module via a first channel across the interface and wherein during an interrupted time period, the transmitter module communicates the at least one data stream comprising a trigger message packet to the receiver module via a second channel, differing from the first channel, across the interface, the trigger message packet comprising a representation of data values that upon reception of the trigger message packet by the receiver, the receiver inserts the data values into the at least one data stream to maintain a time base between the transmitter module and the receiver module.

2. The system as recited in claim 1, wherein a size of the trigger message packet is less than a size of each of the data packets.

3. The system as recited in claim 1, wherein the first channel is formatted to accept a packet size of the data packets.

4. The system as recited in claim 1, wherein the second channel is formatted to accept a packet size of the trigger message packet.

5. The system as recited in claim 1, wherein the representation of the data values denotes the same number of regular sampled values that would be transmitted during the uninterrupted time period.

6. The system as recited in claim 1, wherein the representation of data values is a representation of a plurality of packets that would denote the same number of data packets that would be transmitted during the uninterrupted time period.

7. The system as recited in claim 1, wherein the interface is a serial transmission path.

8. The system as recited in claim 1, wherein the transmitter further communicates monitor data during the interrupted time period via a third channel, differing from both the first and the second channel, across the interface.

9. The system as recited in claim 1, wherein the time base is established prior to the transmitter module communicating the at least one data stream via the first channel.

10. A method comprising:
transmitting at least a first and a second data stream comprising data packets from a transmitter module to a receiver module via a first channel and a second channel, respectively, across an interface;
interrupting the first and the second data stream;
inserting a trigger message packet in one of the first and second data streams; transmitting one of the first and second data streams comprising the trigger message packet from the transmitter module to the receiver module via a third channel, differing from the first and second channels, across the interface; and
inserting data values into the first and the second data streams to maintain a time base between the transmitter module and the receiver module during the interruption period.

11. The method of claim 10, wherein a payload portion of the trigger message packet comprises information regarding which data streams the trigger message packet represents.

12. The method of claim 11, wherein the trigger message packet represents a plurality of data streams.

13. The method of claim 11, wherein the trigger message packet represent a plurality of data packets of the first or second data stream.

14. The method of claim 10, wherein inserting further comprises inserting data values that represent the same number of regular sampled values that would be transmitted during the uninterrupted time period.

15. The method of claim 10, further comprising formatting the third channel to accept a packet size of the trigger message packet.

16. A system comprising:
a receiver module to receive at least one data stream;
a transmitter module coupled to the receiver module via an interface, the transmitter module comprising: a trigger generation module to generate a trigger message packet; and
a logical channel multiplexer module to select the at least one data stream comprising data packets during an uninterrupted time period for communication of the at least one data stream to the receiver module via a first channel across the interface and to select the at least one data stream comprising the trigger message packet during an interrupted time period for communication of the at least one data stream to the receiver module via a control channel, the control channel further comprising control information, across the interface, the trigger message packet comprising a representation of data values that upon reception of the trigger message packet by the receiver, the receiver inserts the data values into the at least one data stream to maintain a time base between the transmitter module and the receiver module during the interrupted time period.

17. The system as recited in claim 16, wherein the first channel is formatted to accept only a packet size of the data packets.

18. The system as recited in claim 16, wherein the data values are at least one of zero values, one values, or arbitrary values.

19. The system as recited in claim 16, wherein the representation of data values denotes the same number of regular sampled values that would be transmitted during the uninterrupted time period.

20. The system as recited in claim 16, wherein the control channel supports data streams having packets of differing formats and lengths.

21. The system as recited in claim 16, wherein the control channel is a High Level Control Logical Channel (HLCLC).

22. The system as recited in claim 16, wherein the interface is a serial transmission path.

23. The system as recited in claim 16, wherein the transmitter further communicates monitor data during the interrupted time period via a second channel, differing from both the first and the control channel, across the interface.

24. The system as recited in claim 16, wherein the time base is established prior to the transmitter module communicating the at least one data stream via the first channel.

* * * * *